(12) United States Patent
Donoghue et al.

(10) Patent No.: US 8,191,307 B2
(45) Date of Patent: Jun. 5, 2012

(54) SYSTEM AND METHOD FOR HARVESTED WATER IRRIGATION

(75) Inventors: Michael L. Donoghue, Placentia, CA (US); James M. Banis, Oro Valley, AZ (US); Barbara E. Booth, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 102 days.

(21) Appl. No.: 12/582,853

(22) Filed: Oct. 21, 2009

(65) Prior Publication Data

US 2011/0088315 A1  Apr. 21, 2011

(51) Int. Cl.
*A01G 25/00* (2006.01)

(52) U.S. Cl. ............................................. 47/48.5; 47/79

(58) Field of Classification Search ............... 47/48.5, 47/58.1 R, 58.1 SC, 79; 137/78.3, 78.2; 239/63; 405/36, 37
See application file for complete search history.

(56) References Cited

U.S. PATENT DOCUMENTS

| | | | |
|---|---|---|---|
| 3,318,449 A | 5/1967 | Jennings et al. |
| 3,543,294 A | 11/1970 | Boester |
| 3,797,667 A | 3/1974 | Rod |
| 3,915,857 A | 10/1975 | Olson |
| 4,011,162 A | 3/1977 | Oldham et al. |
| 4,017,395 A | 4/1977 | Davis |
| 4,112,972 A | 9/1978 | Lajeuness |
| 4,115,879 A | 9/1978 | Toms |
| 4,134,833 A | 1/1979 | McCormick |
| 4,145,279 A | 3/1979 | Selby, III |
| 4,162,218 A | 7/1979 | McCormick |
| 4,168,231 A | 9/1979 | Allen et al. |
| 4,168,232 A | 9/1979 | Allen et al. |
| 4,197,597 A | 4/1980 | Toms |
| 4,228,006 A | 10/1980 | Hanna |
| 4,349,436 A | 9/1982 | Kaump |
| 4,358,864 A | 11/1982 | Medrano |
| 4,359,789 A | 11/1982 | Roberts |
| 4,588,325 A | 5/1986 | Seefert |
| 4,620,817 A | 11/1986 | Cushing |
| 4,871,452 A | 10/1989 | Kohler et al. |
| 4,904,387 A | 2/1990 | Jordan |
| 4,924,536 A | 5/1990 | Houghton |
| 4,934,404 A | 6/1990 | DeStefano |
| 4,986,905 A | 1/1991 | White |
| 5,039,407 A | 8/1991 | Mohrman |
| 5,059,330 A | 10/1991 | Burkhardt |
| 5,084,920 A | 2/1992 | Kimball |

(Continued)

OTHER PUBLICATIONS

EverWater Greyboss Manual, 13 pages, which was public at least one year prior to the filing date of the above-identified application. www.everwater.com.au.

(Continued)

*Primary Examiner* — T. Nguyen (74) *Attorney, Agent, or Firm* — Fitch, Even, Tabin & Flannery LLP (57) ABSTRACT

A system and method for harvested water irrigation is provided. The irrigation system generally collects harvested water from a variety of sources and disperses it from a tank to a landscape for irrigation. The irrigation may be managed using a system controller. The system controller interacts with a variety of devices, including a level controller, a pump or valve, and at least one zone valve. The system may be configured to end irrigation cycles in response to certain events and to supplement harvested water irrigation with potable water as needed or selected.

20 Claims, 3 Drawing Sheets

U.S. PATENT DOCUMENTS

| | | |
|---|---|---|
| 5,099,874 A | 3/1992 | Della Cave |
| 5,100,540 A | 3/1992 | Ramirez et al. |
| 5,106,493 A | 4/1992 | McIntosh |
| 5,117,660 A | 6/1992 | Downs et al. |
| 5,147,532 A | 9/1992 | Leek, Jr. |
| 5,160,606 A | 11/1992 | De Simone et al. |
| 5,173,180 A | 12/1992 | Stewart et al. |
| 5,192,426 A | 3/1993 | DeCoster et al. |
| 5,200,065 A | 4/1993 | Sinclair et al. |
| 5,210,886 A | 5/1993 | Coe, III |
| 5,217,042 A | 6/1993 | Delle Cave |
| 5,217,323 A | 6/1993 | Bilson |
| 5,227,067 A | 7/1993 | Runyon |
| 5,227,068 A | 7/1993 | Runyon |
| 5,243,719 A | 9/1993 | McDonald et al. |
| 5,251,346 A | 10/1993 | Donati |
| 5,254,246 A | 10/1993 | Rivelli et al. |
| 5,262,047 A | 11/1993 | Benskin et al. |
| 5,274,861 A | 1/1994 | Ford |
| 5,285,665 A | 2/1994 | Hetrick, Jr. |
| 5,288,412 A | 2/1994 | Voorhees et al. |
| 5,303,728 A | 4/1994 | Senatore |
| 5,307,650 A | 5/1994 | Mertz |
| 5,313,677 A | 5/1994 | Coe |
| 5,317,766 A | 6/1994 | McDonald et al. |
| 5,322,387 A | 6/1994 | Heine et al. |
| 5,322,623 A | 6/1994 | Benskin et al. |
| 5,403,498 A | 4/1995 | Morrissey et al. |
| 5,406,657 A | 4/1995 | Donati |
| 5,407,562 A | 4/1995 | Baldino |
| 5,409,616 A | 4/1995 | Garbutt et al. |
| 5,447,630 A | 9/1995 | Rummler |
| 5,452,956 A | 9/1995 | Gilliam |
| 5,465,434 A | 11/1995 | Coe |
| 5,487,406 A | 1/1996 | Jirasek |
| 5,498,330 A | 3/1996 | Delle Cave |
| 5,573,677 A | 11/1996 | Dembrosky |
| 5,575,908 A | 11/1996 | Mondragon, Jr. |
| 5,620,594 A | 4/1997 | Smith et al. |
| 5,640,991 A | 6/1997 | King |
| 5,730,179 A | 3/1998 | Taylor |
| 5,759,286 A | 6/1998 | Sarver |
| 5,759,387 A | 6/1998 | Wilkes |
| 5,780,860 A | 7/1998 | Gadgil et al. |
| 5,814,227 A | 9/1998 | Pavlis |
| 5,845,346 A | 12/1998 | Johnson, Jr. |
| 5,868,937 A | 2/1999 | Back et al. |
| 5,905,037 A | 5/1999 | Cooney, Jr. et al. |
| 5,919,124 A | 7/1999 | Corlett et al. |
| 5,919,366 A | 7/1999 | Cameron |
| 5,928,492 A | 7/1999 | Corlett et al. |
| 5,938,372 A | 8/1999 | Lichfield |
| 6,041,613 A | 3/2000 | Morse et al. |
| 6,059,712 A | 5/2000 | Corlett et al. |
| 6,061,957 A | 5/2000 | Takashima |
| 6,068,773 A | 5/2000 | Sheaffer |
| 6,096,185 A | 8/2000 | Corlett et al. |
| 6,132,138 A | 10/2000 | Haese |
| 6,139,729 A | 10/2000 | Gonzalez, Jr. |
| 6,206,612 B1 | 3/2001 | Meyer |
| 6,243,986 B1 | 6/2001 | Crowley |
| 6,269,667 B1 | 8/2001 | Back et al. |
| 6,281,802 B1 | 8/2001 | Venable et al. |
| 6,282,733 B1 | 9/2001 | Gonzalez, Jr. |
| 6,299,775 B1 | 10/2001 | Elston |
| 6,327,731 B2 | 12/2001 | Back et al. |
| 6,379,538 B1 | 4/2002 | Corlett et al. |
| 6,379,546 B1 | 4/2002 | Braun |
| 6,383,369 B2 | 5/2002 | Elston |
| 6,402,945 B1 | 6/2002 | Swales et al. |
| 6,409,788 B1 | 6/2002 | Sower |
| 6,482,325 B1 | 11/2002 | Corlett et al. |
| 6,490,866 B1 | 12/2002 | Cummings |
| 6,497,741 B2 | 12/2002 | Sower |
| 6,547,488 B2 | 4/2003 | Imbrigiotta |
| 6,562,236 B2 | 5/2003 | Rylander et al. |
| 6,616,375 B1 | 9/2003 | Eriksson |
| 6,620,329 B2 | 9/2003 | Rosen et al. |
| 6,635,176 B1 | 10/2003 | Lorente |
| 6,651,383 B2 | 11/2003 | Grott |
| 6,673,251 B2 | 1/2004 | Swales et al. |
| 6,682,578 B2 | 1/2004 | Sower |
| 6,702,942 B1 | 3/2004 | Nield |
| 6,725,601 B2 | 4/2004 | Chick |
| 6,746,612 B2 | 6/2004 | Hammond |
| 6,796,250 B1 | 9/2004 | Greene |
| 6,802,090 B2 | 10/2004 | Martin |
| 6,838,000 B2 | 1/2005 | Braun |
| 6,846,343 B2 | 1/2005 | Sower |
| 6,846,407 B2 | 1/2005 | Anderson et al. |
| 6,887,375 B2 | 5/2005 | Johnson |
| 6,904,926 B2 | 6/2005 | Aylward et al. |
| 6,910,495 B2 | 6/2005 | Lafalce |
| 6,955,765 B2 | 10/2005 | Rosen et al. |
| 6,969,460 B2 | 11/2005 | Bertram |
| 7,000,437 B2 | 2/2006 | Raney et al. |
| 7,012,042 B1 | 3/2006 | Cataldo et al. |
| 7,025,076 B2 | 4/2006 | Zimmerman, Jr. et al. |
| 7,121,292 B2 | 10/2006 | Aylward et al. |
| 7,147,771 B2 | 12/2006 | Turley |
| 7,267,235 B2 | 9/2007 | Sharir |
| 7,311,115 B1 | 12/2007 | Wendell et al. |
| 7,344,640 B2 | 3/2008 | Gannon et al. |
| 7,383,721 B2 | 6/2008 | Parsons et al. |
| 7,404,899 B2 | 7/2008 | Rosen et al. |
| 7,416,672 B2 | 8/2008 | Ballew |
| 7,435,317 B2 | 10/2008 | Hata |
| 7,441,412 B2 | 10/2008 | Jensen |
| 7,491,337 B2 | 2/2009 | Karaman |
| 7,532,954 B2 | 5/2009 | Evelyn-Veere |
| 2003/0213754 A1 | 11/2003 | Rosen et al. |
| 2003/0230522 A1 | 12/2003 | Pavel |
| 2004/0144704 A1 | 7/2004 | Johnson |
| 2004/0168992 A1 | 9/2004 | Ben-Amotz |
| 2005/0010465 A1 | 1/2005 | Drew et al. |
| 2005/0029188 A1 | 2/2005 | Jennings et al. |
| 2005/0056581 A1 | 3/2005 | Arguello |
| 2005/0082382 A1* | 4/2005 | Evelyn-Veere ................ 239/63 |
| 2005/0103724 A1 | 5/2005 | Wilkins et al. |
| 2005/0115894 A1 | 6/2005 | Jennings et al. |
| 2005/0127010 A1 | 6/2005 | Rosen et al. |
| 2005/0135880 A1 | 6/2005 | Stark |
| 2005/0199842 A1 | 9/2005 | Parsons et al. |
| 2006/0091046 A1 | 5/2006 | Rosen et al. |
| 2006/0156725 A1 | 7/2006 | Kenessey |
| 2006/0175264 A1 | 8/2006 | Ballew |
| 2007/0090030 A1 | 4/2007 | Teran et al. |
| 2007/0119763 A1 | 5/2007 | Probst |
| 2007/0221362 A1 | 9/2007 | Stewart et al. |
| 2008/0017566 A1 | 1/2008 | Hill |
| 2008/0067125 A1 | 3/2008 | Wilkins et al. |
| 2008/0142438 A1 | 6/2008 | Kent |
| 2008/0173581 A1 | 7/2008 | Maclean |
| 2008/0190020 A1* | 8/2008 | Todd ............................. 47/48.5 |

OTHER PUBLICATIONS

EverWater Greymate brochure, 8 pages, which was public at least one year prior to the filing date of the above-identified application. www.everwater.com.au.

* cited by examiner

SYSTEM AND METHOD FOR HARVESTED WATER IRRIGATION

FIELD

The present invention relates to irrigation and, more particularly, to harvested water irrigation systems and methods of controlling such systems.

BACKGROUND

Conservation of the world water supply is becoming increasingly important. In the United States, it has been reported that Americans use an average of 101 gallons of water per day, while only about 20.5 gallons per day are needed to maintain life, hygiene and food production. Given that landscape needs are estimated to account for between 20% and 50% of the 95,000 gallons of water consumed by the average U.S. household per year, conserving water used for landscaping presents an important opportunity in the global efforts to conserve water.

Water conservation techniques in many areas are known. In the landscape irrigation field, controlling the duration and timing of watering and using more efficient watering devices are useful first steps to reducing water usage. Planning water-efficient landscapes by using plants more acclimated to their surroundings, for example, more drought-resistant plants in arid areas, also aids water conservation. Using automated control systems instead of hand watering or using soaker hoses, for instance, avoids overwatering and losses from evaporation or runoff. Additionally, controlled irrigation systems conserve water by targeting different zones of a landscape and delivering only as much water as necessitated by a particular landscape, based in part by recent climate considerations. While these efforts have been useful, there remains meaningful room for improvement.

A largely untapped water-conservation resource is the use of harvested water. Harvested water may include rainwater recapture, landscape runoff, irrigation runoff, HVAC (heating, ventilating, and air conditioning) condensate and gray (or grey) water. Gray water is waste water produced from mainly domestic uses such as using showers, sinks, washing machines, dishwashers, and washing cars. In most domestic and commercial settings, gray water is not separated from black water (septic waste from toilets) and both are fed into a local sewer system. Because it contains organic waste, bacteria and other harmful components, black water must be disposed of in this manner. However, gray water most often is safe enough for reuse in a variety of applications after minimal or no treatment. Currently, systems exist to reuse harvested water in place of potable (fresh) water in very limited applications, such as for flushing toilets, washing cars, and irrigating landscapes. These uses, especially in irrigation, are often heavily regulated, if permitted at all. However, some areas, especially those constantly plagued by water shortages, are loosening harvested water restrictions, creating a valuable opportunity for harvested water-type irrigation systems.

While existing systems may reclaim harvested water for use in irrigation, they often do not consider that the harvested water produced from a given source may not fulfill or precisely match the irrigation needs of that particular area. Moreover, the systems often are not designed to account for other common sources of waste during irrigation. Thus, a need remains for easy and economical utilization of harvested water systems that allow integrated control of a harvested water irrigation system in a user-friendly fashion to achieve maximum water-saving benefits, especially for residential and commercial irrigation purposes.

DETAILED DESCRIPTION

In general, a method and system for harvested water irrigation is provided. The irrigation system collects harvested water from one or more sources and thereafter disperses it from a tank to a landscape for irrigation purposes. The irrigation may be managed using a system controller capable of following and adjusting a preset watering schedule or creating one of its own. The system controller may interact with a variety of devices, including a water level sensor and controller, filter(s), pump(s) or gravitational outlet valves, at least one zone valve, at least one potable water valve, and weather stations, rain sensors, moisture sensors and other sensing devices. When a watering is scheduled, and the harvested water collected in the tank has reached a first predetermined level, the system controller begins a harvested water irrigation cycle to at least one zone in the landscape. A zone may have one or more specific types of emission devices which may be specially adapted to the particular type of plant life in that portion of the landscape. The system controller ends the harvested water irrigation cycle when the watering schedule is complete, or when the harvested water within the tank falls to a second predetermined level. The system controller may finish the watering schedule when sufficient harvested water is available again.

The system controller also may end an irrigation cycle in one or more zones in response to other events, such as detecting a threshold amount of rainfall or a maximum acceptable soil moisture balance, represented by the field capacity of the soil. Additionally, the system controller may be configured to supplement harvested water irrigation with potable water irrigation when desired or necessary, such as when insufficient amounts of harvested water are produced but an irrigation cycle is needed and/or scheduled. So configured, a harvested water irrigation system provides an economical, easy-to-use system that is optimized to conserve water use for irrigation.

Figure 1:
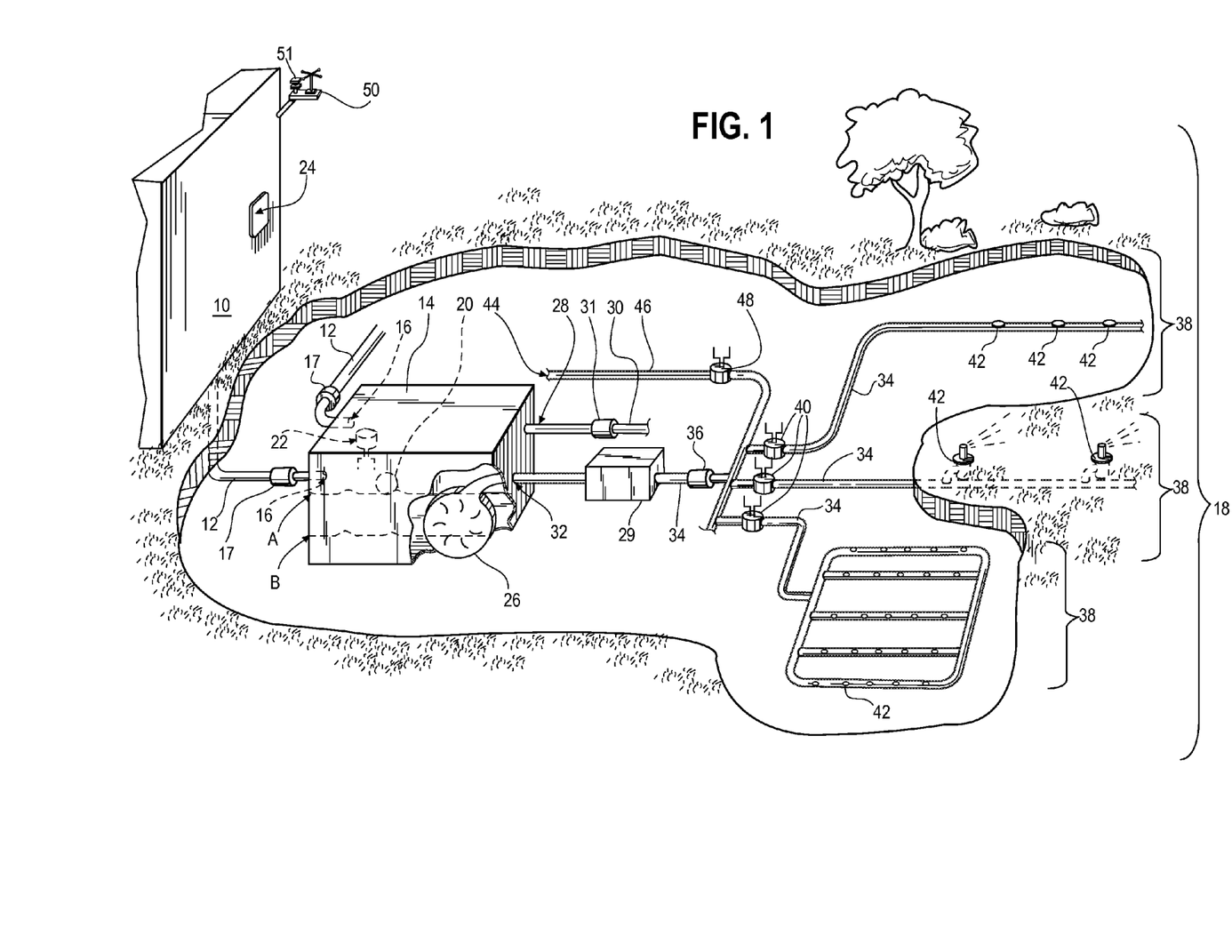
FIG. 1 is a schematic view of a harvested water irrigation system.

Harvested water is collected and fed into the harvested water irrigation system. With reference to FIG. 1, a building 10 may provide at least one source of gray water. The building may be residential or commercial. The gray water sources generally may include showers, tubs, sinks, dishwashers, washing machines and the like. Black water sources, such as toilets, are typically inappropriate for use with the harvested water irrigation system, unless the black water is first treated to remove hazardous materials. Other harvested water sources, such as rainwater recapture, landscape runoff, irrigation runoff, and HVAC condensate are similarly collected in any manner generally known in the art. The harvested water is transported from the one or more harvested water sources through one or more harvested water supply lines 12 to a tank 14 via one or more harvested water inlets 16. The one or more harvested water supply lines 12 may optionally have a check valve 17 to prevent backflow. By one approach, a series of tanks may be used in place of a single tank. By another approach, there may be more than one harvested water inlets 16 for a particular source of water, such as when an apartment complex delivers gray water from separate apartments to one or more tanks.

The size of the tank(s) 14 will vary depending upon the application. For instance, a large commercial building or a residential apartment complex containing a relatively large number of gray water sources or generating a greater amount of HVAC condensate may require a larger tank (or a series of slightly enlarged tanks) than the size of tank needed for a single-family home. The size of the landscape 18 to be irrigated also may affect the tank size. A smaller tank size may allow easier installation, especially where space for the tank is limited. However, a smaller tank may not allow optimization of the harvested water to actual irrigation needs. In practice, it is possible that the harvested water available, the storage capacity for the harvested water, and the landscape watering requirements may not exactly match. To account for such variances, a system controller is provided that may monitor the water level of single or multiple tanks and may make decisions about which water source to use for irrigation needs. Additionally, the system controller may make irrigation and water source decisions based on external factors, such as economic tariffs or credits imposed or applied by a water purveyor.

The tank 14 may be located inside or outside the building 10. If outside the building, the tank 14 may be above ground, but preferably the tank is subsurface. Subsurface tanks avoid the need to replace plants or other usable landscape areas with a tank storage area that may require aesthetically-pleasing landscaping to disguise them. Subsurface tanks also may help avoid emission of unpleasant odors or noise that may be associated with storing and delivering the harvested water.

As harvested water enters the tank 14, a level sensor 20 monitors the level of water within the tank. The level sensor 20 communicates the water level to a level controller 22. The level controller 22, in turn, communicates with a system controller 24. The controllers may communicate in any known fashion, including hardwire or wirelessly. In one control system, when the level sensor 20 (via the level controller 22) detects and communicates a first predetermined level "A" to the system controller 24, the system controller starts a harvested water irrigation cycle according to a preset watering schedule. The harvested water irrigation cycle will run until the end of the preset watering schedule. By another approach, the harvested water irrigation cycle will continue until a second predetermined level "B" is reached. Other events, as more fully described below, may optionally end the cycle before a watering schedule is completed or the second predetermined level B is reached.

By one approach, the first predetermined level A is higher than the second predetermined level B. The difference between the levels ensures that a small amount of harvested water, such as, for example, the amount of gray water produced by washing hands, will not trigger an irrigation cycle, whereas a large amount of harvested water, such as the amount of gray water produced by taking a long shower, will start an irrigation cycle. The first predetermined level A will vary depending upon the size of the landscape to be irrigated, the size of the building (i.e., the gray water and HVAC condensate source), the typical amount of rainfall and irrigation runoff, and the size of the collection tank(s). For example, an apartment complex may have a higher predetermined level than a single-family home, such that an irrigation cycle is not started each time a shower is taken somewhere in the apartment complex, while the same amount of gray water generated from a shower in the single-family home may start an irrigation cycle.

Figure 3:
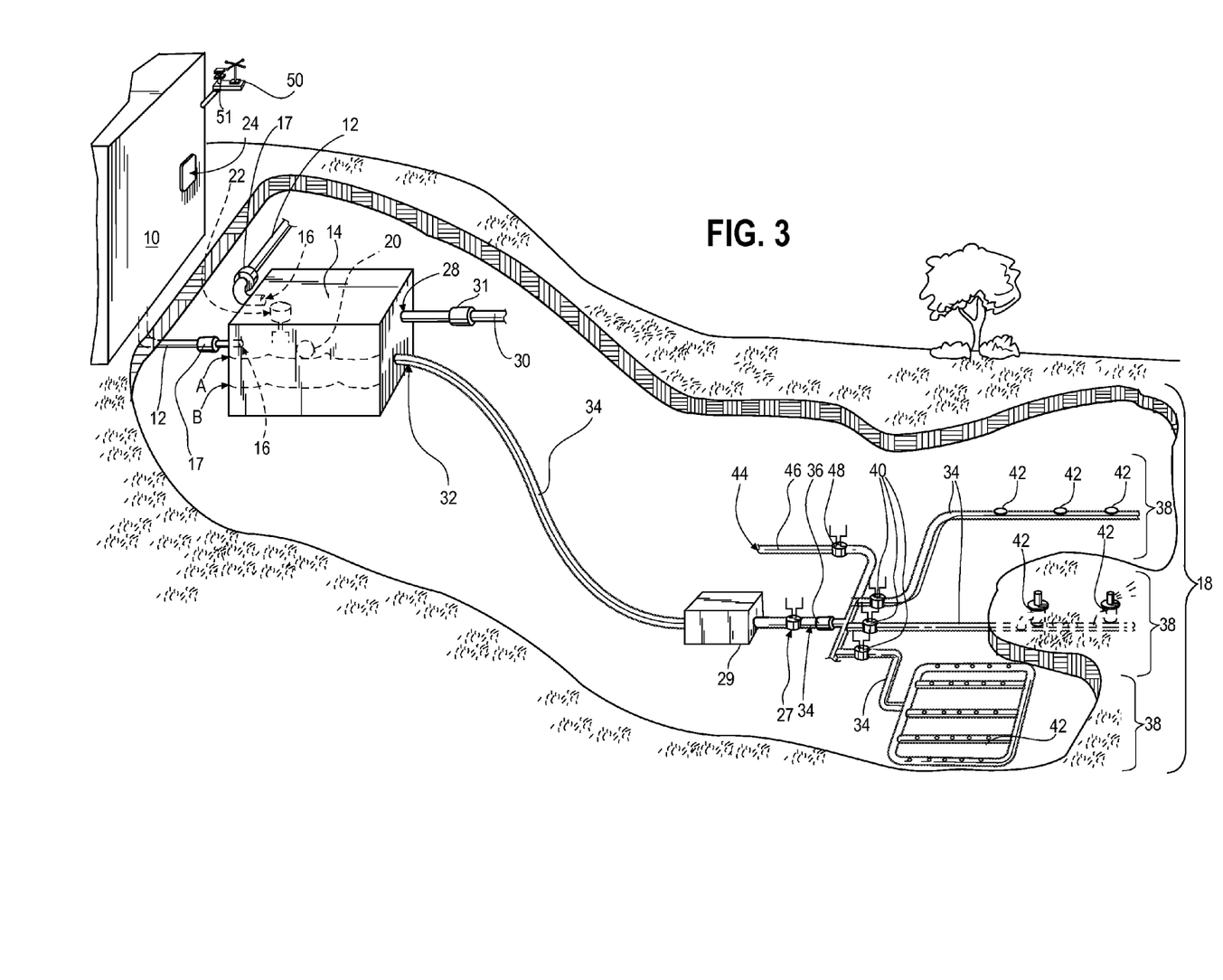
FIG. 3 is a schematic view of a harvested water irrigation system.

Regardless of the actual value of the first predetermined level A, when a watering is scheduled and the first predetermined level has been reached, the system controller 24 activates a pump 26. The harvested water irrigation system may also contain a filtration system 29. The filtration system 29 may be installed downstream of the pump, or at a point upstream of the pump, including prior to entry of the harvested water into the tank 14. The pump 26 and filtration system 29 may optionally both be contained within the tank 14 along with the level sensor 20 and the level controller 22, but should be designed for easy installation and maintenance. The pump 26 and filtration system 29 may also be separate devices that are not co-located. The pump 26 is sized according to the pressure and flow requirements of a given landscape 18. The tank may optionally include pumps in series or parallel as needed to efficiently and economically meet these requirements. Alternatively, the harvested water may be energized via natural gravitational forces, as shown in FIG. 3. In this approach, the one or more tanks 14 may be elevated above the landscape, such as when a house or building is located on a hill requiring irrigation. To deliver the harvested water into the irrigation system, the system controller communicates with and may open one or more gravitational outlet valves 27 allowing the pressure due to the height differential to move the harvested water.

The filtration system 29 may be any known in the art that is capable of removing debris typically found in harvested water (lint, hair, paper scraps, large detergent particles, etc.) to ensure that the irrigation system does not clog. The filter also may be easily cleaned and/or replaced. In general, the system controller activates the pump or opens a gravitational outlet valve, water travels downstream through the filtration system 29, and an irrigation cycle runs according to a watering schedule until the end of the programmed watering, or until the second predetermined level B is reached. The pump is then stopped, or the gravitational outlet valve closed, and the irrigation cycle ends. Other events also may end an irrigation cycle before the end of a watering schedule or before the harvested water reaches the second predetermined level, as explained more fully below. By one approach, the system controller may be user-configured to finish an incomplete irrigation cycle using a potable water supply.

The tank 14 may also contain an overflow outlet 28. The overflow outlet 28 may connect to a sewage line 30. In the event that the harvested water completely fills the tank, but no irrigation is needed, the harvested water flows out of the tank 14 via the overflow outlet 28 into the sewage line 30. The sewage line 30 drains into the local sewer system, a septic system, or another subsurface-type passive irrigation system. The sewage line also may have an optional check valve or other backflow prevention device 29 to prevent sewage from flowing into and contaminating the contents of the tank 14. By one approach, the system control may also control selective bypass or certain harvested water sources when the tank 14 is full, but no irrigation is required. For example, the system controller may redirect rain water or HVAC condensate to a storm water drain.

The pressure source (supplied via the pump 26 or gravity) moves the harvested water from the tank 14 via a harvested water outlet 32 into an irrigation supply line 34. The harvested water supply line 34 near the harvested water outlet 32 may optionally have a check valve 36 for preventing backflow. The irrigation supply line 34 delivers the harvested water to one or more irrigation zones 38 covering the landscape 18. The controller 24 activates a zone by opening a zone control valve 40 for that particular zone. A zone 38 may be a specific landscape planting area. A landscape may be divided into multiple zones to optimize water use such that each zone receives the amount of water that is best suited for the plants and conditions in it or to ensure that there is sufficient pressure to effectively run the watering devices of the activated zone.

In particular, the system controller 24 may calculate the amount of water that should be applied to that particular zone at any given time to result in a desired optimal moisture balance. This optimal moisture balance is represented by the level that assures water will be readily available to the particular plant or landscape in a zone until the next scheduled irrigation cycle. The calculations performed by the system controller may account for variables such as varying soil type, sun and shade mix, slope, plant material, and emission devices used in a particular zone, as well as current, recent or historic weather data. These variables may be input by the user, for example, the user may input a zip code or other geographic identifier. These variables may also be obtained by the system controller by some automated means, supplied by sensors in the irrigation system, supplied by an internal or external database, or a combination of the foregoing.

The rate of evapotranspiration ("ET") also may be calculated for one or more zones. ET, as used herein, refers to the actual ET or potential ET determined from any methodology now known or which may become known in the future. The rate of ET may affect the actual moisture balance of a given zone. Accounting for a high rate of ET may require adding time onto an irrigation cycle to ensure that the optimal moisture balance is achieved. The moisture balance may be calculated or estimated by a system controller, or directly measured via optional moisture sensors located in one or more zones which then communicate with the system controller. Examples of system controllers that determine watering requirements in this general manner are more fully explained in commonly-owned Publication Number US 2008/0288116 A1, which is hereby incorporated by reference.

By one approach, a zone 38 will be irrigated as long as its moisture balance is below a maximum acceptable value. Any irrigation beyond this value results in wasted water. By another approach, a zone 38 will be irrigated as long as its moisture balance is below its optimal value, as determined by the system controller 24 or as set by the user. In general, the system controller determines the moisture balance of one or more zones before irrigation begins. Still referring to FIG. 1, when the system controller 24 determines that a particular zone 38 needs irrigation, it opens the zone control valve 40 corresponding to that particular zone 38. If more than one defined zone 38 needs irrigation, the system controller 24 may water the zones simultaneously or in series, where possible and to the extent desired.

The order of zone irrigation may be predetermined and/or user-defined. For instance, the system controller 24 may be designed to track the moisture balance in each zone 38. Zones may be irrigated based first upon any pending moisture deficits. The controller 24 may then spread irrigation out among the zones 38 such that each zone is gradually watered to a higher and higher moisture balance, up to a level just below the zone's maximum acceptable value. In this manner, the controller 24 may ensure that harvested water is utilized to the greatest extent possible, while as little harvested water as possible is disposed of in the sewer or storm water systems.

Harvested water travels through the irrigation supply line to the open zone control valve(s) 40, and exits via an emission device 42. The emission device may be any generally known in the art such as, but not limited to, spray heads, rotors, drip components and impact drive sprinklers.

By one approach, the irrigation system contains one zone with one type of emission device. By another approach, different emission devices may be utilized to maximize irrigation efficiency depending upon the plant life in a particular zone. For instance, rotors may be used on large expanses of turf, drip lines may be used to target flower beds, and spray heads may be used to target small planting areas. The combination may be optimized to ensure that each type of plant in a particular zone 38 receives its optimal amount of water, but not more than necessary, while also avoiding common water loss methods, such as overspray, run off and misting, and thus conserving water.

Regardless of the number of zones and the emission devices used therein, harvested water irrigation is generally carried out in each zone until the end of a scheduled watering or until the harvested water level falls to the second predetermined level B, whichever occurs first. As mentioned above, the second predetermined level B is less than the first predetermined level A. Like the first predetermined level A, the second predetermined level B will vary depending upon the size of the landscape to be irrigated, the size and type of building providing any gray water or HVAC condensate sources, the typical amount of rainfall and irrigation runoff, and the size of the harvested water collection tanks. When the level sensor 20 (via the level controller 22) detects and communicates the second predetermined level B to the system controller 24, the system controller 24 turns off the pump 26, or closes the gravitational outlet valve 27 (as shown in FIG. 3), and closes the appropriate zone control valve(s) 40. If the end of a scheduled watering cycle was not reached before the harvested water fell to level B, the system controller 24 may complete the scheduled watering when the level of harvested water reaches the first predetermined level A. By another approach, the system controller 24 may complete the irrigation cycle using potable water. The system controller also may delay the remaining period of irrigation until the next scheduled irrigation.

By one approach, the level of harvested water in the tank may reach the first predetermined level A, but a harvested water irrigation cycle will not start. This occurs when the moisture level in the soil in all zones is at the maximum acceptable value. If the system controller determines that the moisture balance in all zones has reached this value, it will not begin any irrigation cycles until the moisture balance of at least one zone falls below its maximum value. When this occurs, the system controller may delay the irrigation until the next scheduled irrigation according to the watering program.

By another approach, the harvested water supply may be insufficient to run an entire watering schedule, or to achieve the optimal moisture balance in one or more zones. This is referred to as a low water level condition. In this instance, the system controller 24 may store the information relating to the last harvested water irrigation cycle, and begin a second harvested water irrigation cycle (upon the harvested water in the tank reaching the first predetermined level A) in the last zone to be irrigated but not reach its optimal moisture balance. This ensures that irrigation is evenly distributed through all zones. Additionally, the system controller 24 may be programmed to monitor or estimate ET values in one or more zones during the low water level condition. When the harvested water again reaches the first predetermined level A, the system controller 24 starts a new harvested water irrigation cycle. If the rate of ET during the low water level condition was high, the system controller 24 may add additional time onto the next harvested water irrigation cycle to account for this additional loss of water. By another approach, the system controller 24 may delay the second harvested water irrigation until the next scheduled cycle.

The harvested water irrigation system may also be designed to dispose of excess harvested water in the landscape, when it is available and if the user is so inclined. In this approach, the system controller 24 will determine which, if any, zones 38 may receive additional harvested water without exceeding their maximum acceptable values. The system controller 24 may then open one or more zone control valves 40 to dispose of excess harvested water in the one or more zones 38. The system controller 24 may end the disposal irrigation cycle based upon a variety of conditions. For instance, a cycle may end when a pre-established water level is reached in the tank 14 (for example, as set by the user, or when the water falls to predetermined level B); when a predetermined amount of watering time has elapsed; or when all zones reach their maximum acceptable values. The system controller 24 may store data regarding this additional watering and adjust subsequent scheduled watering cycles as necessary.

Referring again to FIGS. 1 and 3, the harvested water irrigation system also may optionally include a potable water source 44. The potable water source 44 is typically provided by the local municipality water main or a well on-site. The potable water is delivered via a potable water supply line 46 and may contain at least one potable water valve 48. The at least one potable water valve 48 communicates with the system controller 24 to regulate the delivery of the potable water to the irrigation system. The potable water acts as a supplement and back-up to the harvested water sources, rather than as the main water source. In order to optimize water conservation, the potable water source would only be used when the moisture balance of any zone reaches a critical deficit value, but an insufficient amount of harvested water is contained in the tank to restore the moisture balance above this critical value. The critical deficit value is determined by the system controller 24. For example, it may represent the minimum moisture balance needed to maintain the plant life in a particular zone above the permanent wilting point. If the moisture balance falls to or below the critical deficit value, a critical moisture balance irrigation cycle begins.

Figure 2:
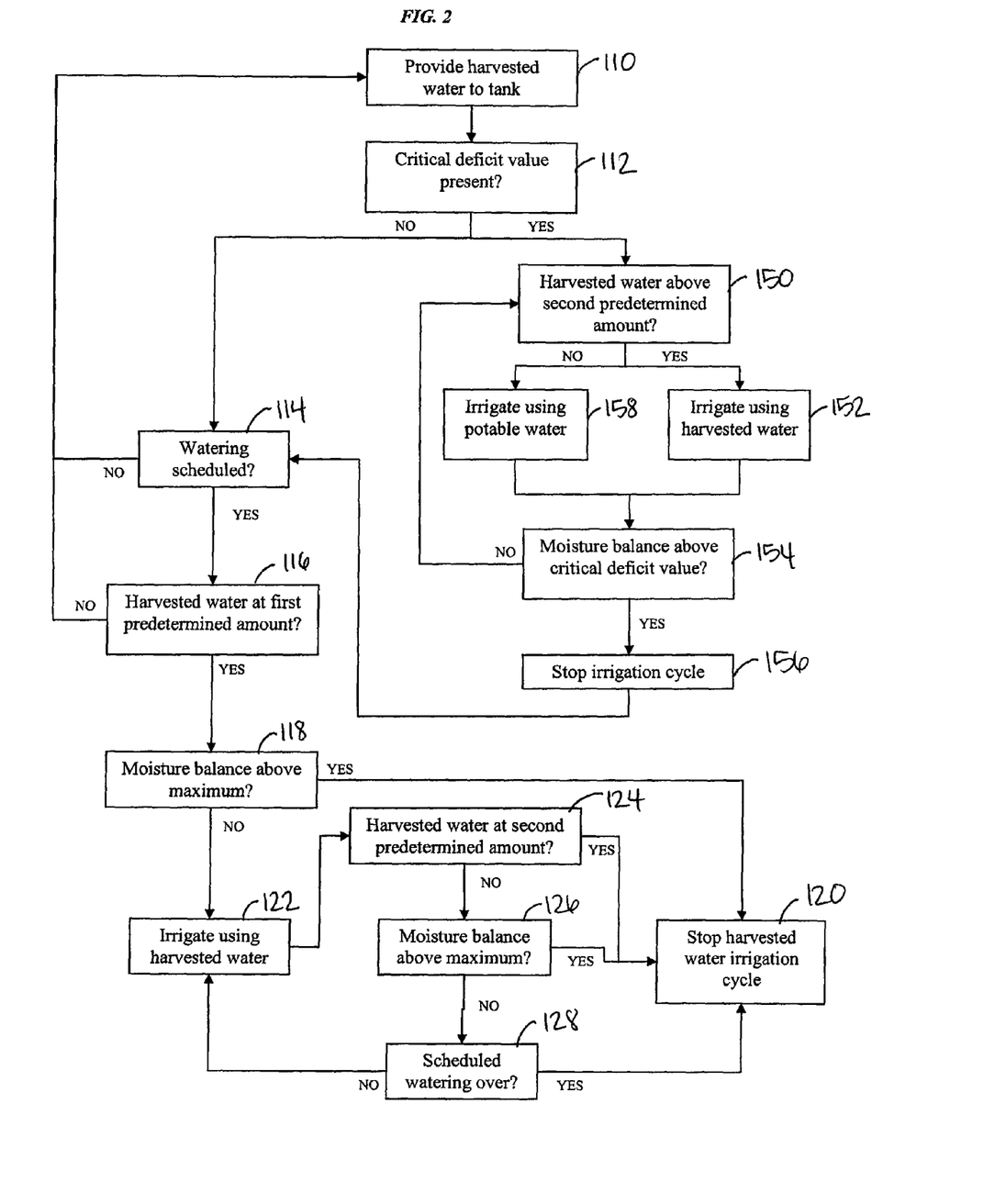
FIG. 2 is a flow diagram.

Referring also now to FIG. 2, the critical moisture balance irrigation cycle begins with harvested water being provided 110 to the tank. The system controller 24 then determines 112 whether the moisture balance of one or more zones has fallen to the critical deficit value. If a critical deficit value is found, the system controller 24 determines 150 whether the level of harvested water in the tank is above the second predetermined amount B. As long as it is above the second predetermined level B, a harvested water irrigation cycle will run 152 until the level of harvested water falls to or below the second predetermined amount B. Alternatively, the system controller 24 may determine run-time based upon the amount of harvested water in the tank 14. This ensures that all available harvested water is used to correct the critical deficit, and potable water is only used as a back-up or supplement as necessary. At this point, the system controller 24 again determines 154 whether the moisture balance of that particular zone has surpassed the critical deficit value. If so, the irrigation cycle is stopped 156, and normal operation resumes. If the system controller 24 determines 154 that the critical deficit value has not been surpassed, a new irrigation cycle will run 158 using potable water. With reference to FIGS. 1 and 3, the system controller 24 will thus open at least one potable water valve 48 and the zone control valve 40 of the particular zone 38 to be irrigated. The potable water is delivered to the emission device 42 via the irrigation supply line 34. With reference again to FIG. 2, the critical moisture balance irrigation cycle will stop 156 when the system control determines 154 that the moisture balance has been restored to a value above the critical deficit value.

By another approach, in a critical moisture balance irrigation cycle, the potable water may be delivered to the tank 14 and subsequently delivered in combination with the harvested water. In this instance, potable water will be delivered to the tank 14 (via a potable water supply line and a potable water inlet) until the moisture balance of the particular zone 38 surpasses the critical deficit value, at which point the system controller 24 will end the irrigation cycle. This approach may be useful, for instance, when the harvested water requires dilution before application to the landscape.

As described above, and now with reference to FIG. 2 additionally, in normal operation, an irrigation cycle begins by providing 110 harvested water to the tank. If the system controller 24 determines 112 that a critical deficit value is not present, the system controller 24 then determines 114 whether a watering is scheduled. If not, the irrigation cycle does not start; the process starts again when more harvested water is provided 110 to the tank. When the system controller 24 determines 114 a watering is scheduled to take place, it next determines 116 whether the harvested water has reached the first predetermined amount A. If it has not, the irrigation cycle does not start, and the irrigation cycle is delayed until it has reached the first predetermined amount A. If the harvested water is at the first predetermined amount A, the system controller 24 then determines 118 whether the moisture balance of the zone(s) to be irrigated is above the maximum acceptable value. If it is, an irrigation cycle does not run 120. If the system controller 24 determines 118 that the moisture balance is below the maximum acceptable value, a harvested water irrigation cycle will run 122. A normal irrigation cycle will end 120 when a full watering schedule has run. This requires that the level of harvested water does not fall 124 to the second predetermined amount B, and that the moisture balance does not reach 126 the maximum acceptable value in all zones.

In a low water level condition, the level of harvested water falls 124 to the second predetermined amount B. This ends 120 the irrigation cycle. The system controller 24 may remember the amount of watering remaining in the schedule irrigation, and may finish it at a later time, or may add it onto the next irrigation cycle, if necessary. Alternatively, the system controller may complete the irrigation cycle using potable water, as described above.

By another approach, other events may intervene to end an irrigation cycle before a normal irrigation cycle is completed. With continued reference to FIG. 2, one such event is when the moisture balance of the zone or zones being irrigated reaches 126 the maximum acceptable value. In that instance, any further watering would result in waste. Thus, the system controller 24 will stop 120 the harvested water irrigation cycle, leaving some level of water in the tank between the first and second predetermined levels. The system controller 24 may store this data in determining the time and duration of the next scheduled watering.

By another approach, any stage of irrigation may be interrupted upon the detection of a saturation threshold of rainfall. With reference to FIGS. 1 and 3, the irrigation system may optionally contain a rainfall sensor 51 as part of a weather station 50 or as a separate device elsewhere in the irrigation system. The weather station 50 communicates with the system controller 24. When the sensor detects the saturation threshold of rainfall, the system controller 24 will pause or stop an irrigation cycle in process. The saturation threshold is high enough that a light sprinkle will not stop irrigation, but that a significant rainfall will. This ensures that harvested or potable water are not wasted by watering when enough precipitation is present to affect the moisture balance of the soil, thus requiring less, if any, irrigation. A new irrigation cycle will not begin until the rainfall sensor 51 no longer detects the saturation threshold of rainfall. The rainfall sensor 51 may also communicate the amount of rainfall to the system controller 24 for use in determining the resulting moisture balance of a particular zone and its effect on the timing and duration of a subsequent irrigation cycle. This system controller feature is described in more detail in commonly-owned U.S. Pat. No. 7,229,026, which is hereby incorporated by reference.

As described, the system and method for harvested water irrigation herein may be used in conjunction with a watering schedule executed by the system controller. The system controller 24 may be programmed such that when a watering schedule is established, harvested water irrigation will not take place until the scheduled watering time. For example, if the harvested water reaches the first predetermined level A in the tank 14 at 4 o'clock in the afternoon, but a watering is scheduled to take place at 6 o'clock the following morning, irrigation will be delayed until the 6 a.m. scheduled watering. At that time, the harvested water in the tank 14 will be used for the irrigation cycle. Additionally, if the system is irrigating according to a watering schedule, and the irrigation is interrupted due to a low water level condition, the system controller 24 may either continue the harvested water irrigation when the level of harvested water again reaches the first predetermined level A, delay until the next scheduled watering, or continue and complete the irrigation cycle with potable water. If the moisture balance of a zone falls to the critical deficit value while an irrigation cycle is delayed or between scheduled watering cycles, the critical moisture balance irrigation cycle will override the current status and an irrigation cycle will run. Once the critical deficit value is surpassed, any remaining irrigation will again be delayed until the scheduled watering time.

A watering schedule or watering window may be defined by the system controller 24 or the user. This water window may be set up by zone or by irrigation cycle. The system controller 24 may take into account factors such as the instance and duration of the most recent harvested water irrigation cycle, zone types, emission device types, soil types, slopes, plant materials, moisture balance and environmental conditions, including rainfall and ET, and watering restrictions. The system controller 24 may also take into account economic factors and availability of water storage. These inputs may be user-defined and updated continuously, periodically, or based upon historical information. Based upon these variables, the system controller may determine the timing (i.e., when to start) and duration of an irrigation cycle. This system controller feature, its interaction with an irrigation system, and other controller features are more fully described in commonly-owned Publication Number US 2008/0288116 A1 (briefly described above) and Publication Number US 2006/0293797 A1, which is also hereby incorporated by reference.

In another embodiment, the system controller may optionally have an extended absence setting which may be activated by a user. When a building is vacant or substantially vacated, such as during vacations or holidays, little to no gray water will be produced. Thus, the harvested water level may not reach the first predetermined level A in a timely manner, if at all, and harvested water irrigation may not occur. However, when the extended absence setting is activated, the system controller 24 will perform scheduled and otherwise necessary (i.e., critical moisture balance) irrigation cycles using potable water. By one approach, the extended absence setting will first ensure that if the level of harvested water in the tank 14 is above the second predetermined level B, but below the first predetermined level A, a harvested water irrigation cycle will run until the harvested water reaches the second predetermined level B. Any remaining necessary irrigation will be performed using potable water, similar to the critical moisture balance irrigation cycle.

By another approach, the irrigation system will default into the extended absence setting when the level of harvested water in the tank 14 does not reach the first predetermined level A for a period of time specified by the user. This ensures that a landscape does not go un-watered in the event that the user forgets to turn on the extended absence setting. The extended absence setting may have a default watering schedule that is predetermined or programmed by the user. This watering schedule will be followed upon a system default.

In another embodiment, the system controller 24 may track and be able to report on the amount of harvested and potable water used for irrigation during a given period of time. Usage may be tracked based on calculations using pressure, run time and precipitation rate of the emission devices, or may be directly metered. This feature allows a user to adjust watering schedules to ensure optimal system performance and water conservation. It also allows the user to prove compliance with any restrictions on use of potable water that a municipality may implement.

It will be understood that various changes in the details, materials, and arrangements of parts and components which have been herein described and illustrated in order to explain the nature of the system and method for harvested water irrigation may be made by those skilled in the art within the principle and scope as expressed in the appended claims. Furthermore, while various features have been described with regard to a particular embodiment, it will be appreciated that features described for one embodiment also may be incorporated with the other described embodiments.

What is claimed is:

1. A method for irrigating comprising:
   providing an amount of harvested water to a tank from at least one source;
   determining when the amount of harvested water reaches a first predetermined amount;
   starting an irrigation cycle when the amount of harvested water reaches the first predetermined amount by delivering the harvested water to at least one zone;
   determining when the amount of harvested water reaches a second predetermined amount; and
   stopping the irrigation cycle to at least one zone when the amount of harvested water reaches the second predetermined amount.

2. The method of claim 1 further comprising:
   determining a moisture balance corresponding to at least one zone;
   when the moisture balance of at least one zone reaches a maximum field capacity, stopping the irrigation cycle in that zone.

3. The method of claim 2 further comprising:
   determining when the amount of harvested water in the tank reaches a disposal amount;
   determining whether one or more zones are not at a maximum field capacity;
   starting a disposal irrigation cycle to the one or more zones not at a maximum field capacity; and
   stopping the disposal irrigation cycle when a disposal ending event occurs, wherein the disposal ending event is selected from the group consisting of the amount of harvested water reaches a pre-established level; a predetermined amount of watering time has elapsed; and all zones reach their maximum field capacity.

4. The method of claim 1 further comprising determining the moisture balance of at least one zone before starting the irrigation cycle.

5. The method of claim 4 wherein if the moisture balance of one or more zones is already at the maximum field capacity, then such one or more zones will not be irrigated.

6. A method for use in irrigation control comprising:
providing an amount of harvested water to a tank from at least one source;
determining when the amount of harvested water reaches a first predetermined amount;
starting an irrigation cycle when the amount of harvested water reaches the first predetermined amount by delivering the harvested water to at least one zone;
determining a moisture balance corresponding to at least one zone;
when the moisture balance of a particular zone of at least one zone reaches a maximum field capacity, stopping the irrigation cycle in that particular zone;
determining when the amount of harvested water reaches a second predetermined amount;
stopping the irrigation cycle when the amount of harvested water reaches the second predetermined amount; and
starting an irrigation cycle in at least one zone using a potable water source if the moisture balance before irrigation of at least one zone falls to a critical deficit level before the amount of harvested water reaches the first predetermined amount.

7. The method of claim 6 further comprising stopping the irrigation cycle using the potable water source when the moisture balance of the at least one zone being irrigated using potable water rises above the critical level.

8. The method of claim 7 further comprising:
starting a harvested water irrigation cycle using harvested water when the amount of harvested water reaches the first predetermined amount; and
stopping the harvested water irrigation cycle when an ending event occurs.

9. The method of claim 8 wherein the ending event is first to occur of the amount of harvested water reaches the second predetermined amount, the moisture balance of a zone reaches the maximum field capacity, and an amount of rainfall reaches a saturation threshold.

10. The method of claim 9 wherein the saturation threshold is detected by a rainfall sensor or a soil moisture sensor.

11. The method of claim 4 wherein if the moisture balance before the irrigation cycle of at least one zone falls below a critical deficit level before the amount of harvested water reaches the first predetermined amount, the harvested water in the tank is supplemented with potable water until the first predetermined amount is reached.

12. The method of claim 1 wherein the irrigation cycle is delayed until a scheduled watering.

13. The method of claim 12 further comprising:
monitoring a moisture balance of at least one zone before the irrigation cycle;
determining if the moisture balance of a zone falls to critical deficit level before the scheduled watering; and
irrigating the zone until the moisture balance rises above the critical deficit level.

14. The method of claim 8 wherein the harvested water irrigation cycle is delayed until a scheduled watering.

15. The method of claim 1 wherein irrigation is via emission devices selected from the group consisting of spray heads, rotors, drip components and impact drive sprinklers.

16. The method of claim 1 wherein when an amount of rainfall reaches a saturation threshold, all irrigation stops if in progress and will not start if not in progress.

17. The method of claim 1 further comprising determining the irrigation cycle timing and duration based upon at least one variable.

18. The method of claim 17 wherein the at least one variable is selected from the group consisting of a watering schedule, an evapotranspiration (ET) value, a moisture balance of at least one zone, and a saturation threshold of rainfall.

19. The method of claim 18 further comprising determining an amount of time remaining in the watering schedule when the amount of harvested water reaches the second predetermined amount.

20. The method of claim 19 wherein the amount of time remaining is finished during, or added to, a subsequent irrigation cycle.

* * * * *